3,264,039
DEVICES FOR LIMITING THE SLIPPING OF VEHICLE WHEELS DURING BRAKE APPLICATIONS
Jean Cadiou, Paris, France, assignor to Société Anonyme André Citroën, Paris, France
Filed May 19, 1965, Ser. No. 457,039
Claims priority, application France, May 22, 1964, 975,591, Patent 85,797
1 Claim. (Cl. 303—6)

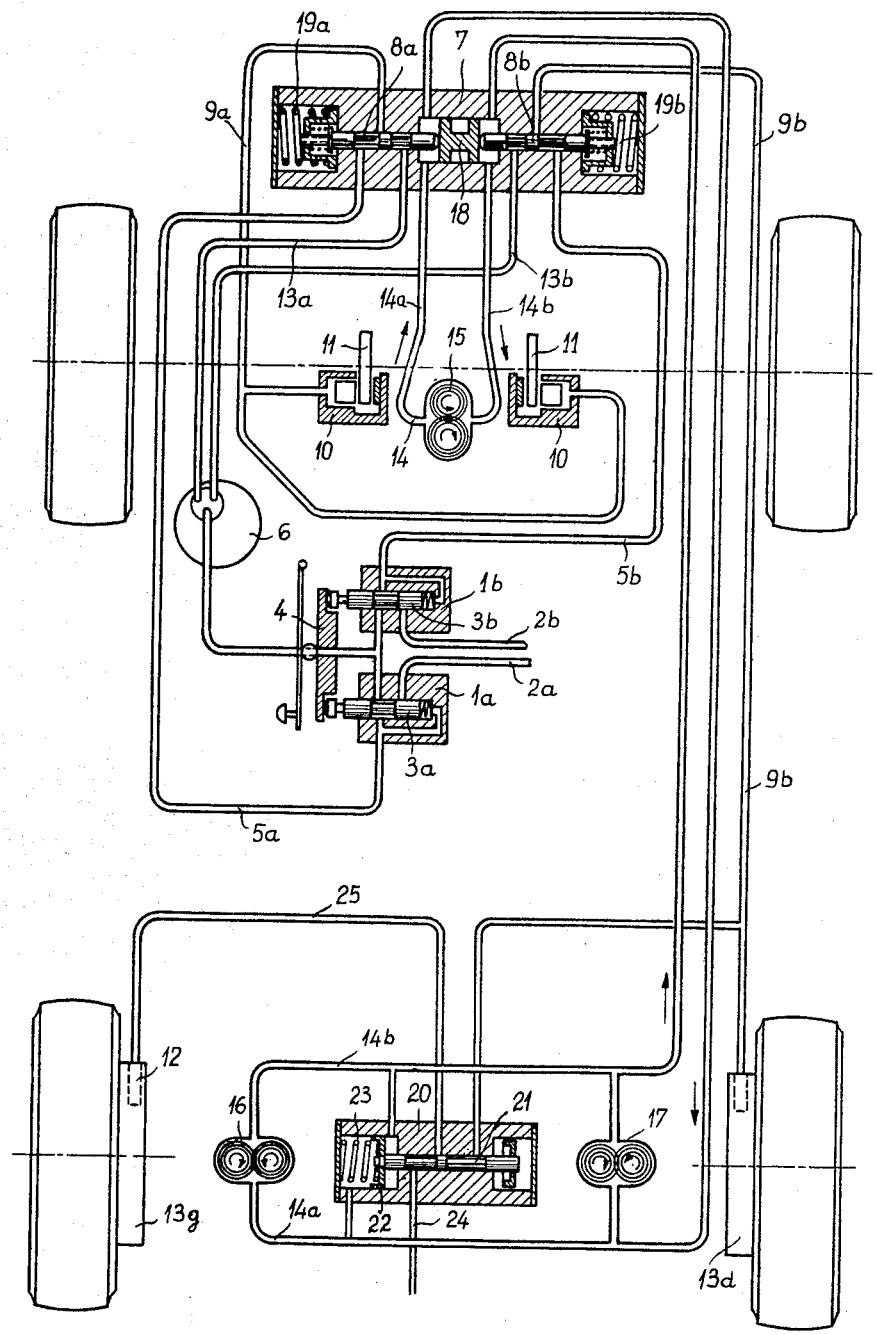

A device for limiting the slipping of the wheels of a vehicle during brake applications is already known, which is characterized in that it comprises, in addition to the conventional hydraulic circuit of the braking system with separate pipe lines respectively for the front wheels and the rear wheels, an auxiliary hydraulic circuit comprising a plurality of pumps each driven with a proper gear ratio from one or the two wheels of a pair of front or rear wheels, this circuit comprising a distributor acting upon the hydraulic braking circuit in such a way that the reduction in the rate of operation of a pump which is due to the slipping of the drive wheel or wheels introduces a pressure unbalance into the circuit, whereby the distributor cuts off the braking pressure circuit of said wheel or wheels.

However, this device is objectionable in that it cannot operate when the four wheels of the vehicle slip simultaneously.

It is therefore the object of the present invention to provide an improvement in a system of this character which, by simply adding a complementary member, permits of releasing one of the wheels (or both wheels) in order to make the device again responsive to the slipping of the other wheels and thus restore the operative condition of this device.

According to this invention a member responsive to the difference in pressure between the suction and delivery sides of the pump associated with one of the wheels is branched off said pump, this member acting upon a slide valve or like device adapted, when the pressure differential is inferior to a predetermined value, to connect that section of the pressure-fluid circuit which feeds the brake cylinder or cylinders of the wheel concerned to the return line leading to the fluid reservoir.

The device according to this invention will now be described by way of example with reference to the accompanying drawing of which the single figure illustrates diagrammatically a typical form of embodiment of this device.

In the known arrangement reminded hereinabove, in addition to the brake circuits 9a and 9b feeding respectively the front and rear brakes, there is provided a closed circuit 14a, 14b comprising one or a plurality of pumps 15 driven from the front wheels and one or a plurality of pumps driven from the rear wheels 16, 17, this circuit passing through a distributor 7 adapted, in case of unequal pressures in circuit sections 14a and 14b, to act upon a slide-valve system 8a, 8b responsive to a central piston 18 for connecting to the exhaust either the front wheel brake circuit or the rear wheel brake system, according to the direction in which this inequality takes place.

It is clear that with this arrangement the distributor 7 cannot operate if the four wheels of the vehicle slip to the same extent, since in this case the pressures are the same in the two branches 14a, 14b of the circuit, thus preventing the piston 18 of the distributor from being urged in one or the other direction.

To avoid this inconvenience there is provided according to this invention a valve 20 branched off one of the pumps 15, this valve comprising a slide member 21 responsive to a sliding piston 22 of which one side urged by a spring 23 communicates with the pipe line 14a, the opposite side of the piston communicating with pipe line 14b. The valve 20 connected to a return line 24 leading to the reservoir is inserted in the circuit supplying pressure fluid to the brake cylinder 13g of a wheel, this wheel driving the pump 16.

The piston 22 actuates the slide valve 21 in such a way that when the pressure differential between pipe lines 14a and 14b falls below a predetermining value corresponding to the spring force the circuit section 25 leading to the brake cylinder 12g is cut off from the remaining portion of circuit 9b and connected to the return line 24.

It is clear that, with this arrangement, when the velocity of rotation of the wheel 13g driving pump 16 is zero or very moderate, the detector piston 22 connects the circuit 25 to the reservoir and since this wheel is no more braked it resumes its rotation. As pump 16 resumes its operation as a consequence of the wheel rotation a state of unbalance occurs between the pressure values attained in pipe lines 14a and 14b (assuming that the four wheels have been locked simultaneously), thus actuating the distributor 7 to release the front wheel and subsequently the rear wheel 13g; now with the four wheels released from their locked condition the system is brought back to its initial condition and the efficiency of the brakes is restored.

It will be noted that the detector piston has the same behavior when, in case the vehicle moves at a low speed and therefore the pumps have but a moderate output, the difference in pressure between the suction and delivery sides of pump 16 is not sufficient to move the piston 22 against the resistance of spring 23.

What I claim as new is:

Improvement in the device for limiting the slipping of the wheels of a vehicle during a brake application, which device incorporates, in addition to the brake circuits feeding respectively the front and rear brake cylinders, a closed circuit comprising one or more pumps driven from the front wheels and one or more pumps driven from the rear wheels, said closed circuit passing through a distributor which, in case of pressure differential between the branch sections of said closed circuit, is adapted to connect to the return line leading to the fluid reservoir, by means of a slide valve system controlled by a central piston, either the front wheel brake circuit or the rear wheel brake circuit, according to the direction in which this pressure differential takes place, this improvement being characterized in that a valve having its slide member responsive to a difference in pressure between the suction and delivery side of the pump driven from one of said wheels operates to exhaust the fluid circuit feeding the brake cylinder of said one wheel, whereby when said pressure differential is inferior to a predetermined value that section of said circuit which feeds the brake cylinder or said wheel is connected to said return line.

No references cited.

EUGENE G. BOTZ, *Primary Examiner.*